June 11, 1968 G. R. HADFIELD 3,387,666
FREEING, SEVERING AND ROLLING UP SOD
Filed Jan. 17, 1967 3 Sheets-Sheet 1

INVENTOR.
GLEN R. HADFIELD,
BY Berman, Davidson & Berman
ATTORNEYS.

June 11, 1968 G. R. HADFIELD 3,387,666
FREEING, SEVERING AND ROLLING UP SOD
Filed Jan. 17, 1967 3 Sheets-Sheet 2
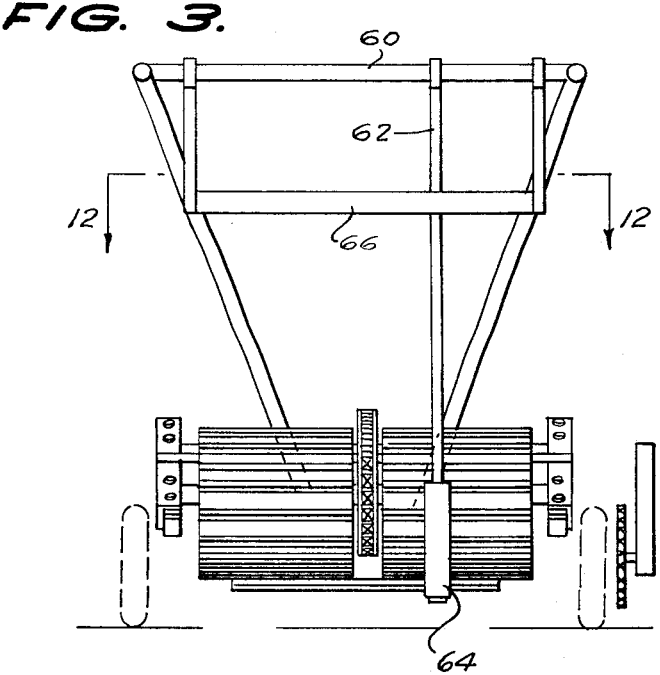
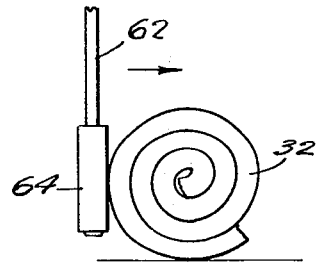
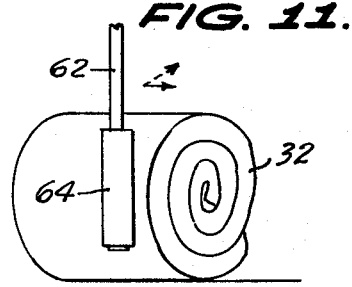
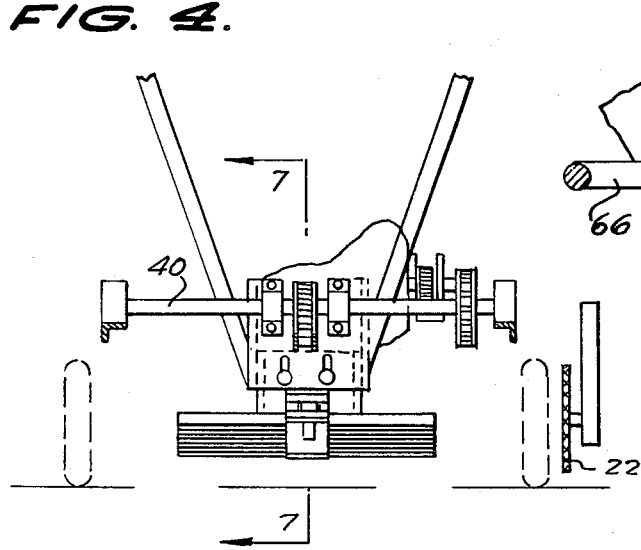
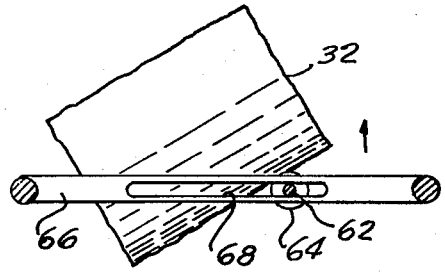
INVENTOR.
GLEN R. HADFIELD,
BY
Berman, Davidson & Berman
ATTORNEYS.

United States Patent Office 3,387,666
Patented June 11, 1968

3,387,666
FREEING, SEVERING AND ROLLING UP SOD
Glen R. Hadfield, 1598 W. Auburn Road,
Rochester, Mich. 48063
Filed Jan. 17, 1967, Ser. No. 609,838
4 Claims. (Cl. 172—20)

ABSTRACT OF THE DISCLOSURE

A combination sod cutter and sod roll former in which the cutter operates continuously to sever a strip of sod of indefinite extent; a transverse knife operates at predetermined intervals to cut the sod strip into predetermined lengths, said knife also acting to initiate rolling up the sod length and means to complete the rolling up of consecutive lengths.

---

This invention relates to a self-propelled machine for severing a continuous length of sod of predetermined width, cutting the length of sod into strips of predetermined length, rolling the severed strips and discharging them from the path of the machine.

The first really successful sod-cutting machine is shown in Patent 2,345,425, dated Mar. 28, 1944. It completely severs sod in a predetermined width below the ground and cuts free the edges, forming a continuous strip of indefinite length as the machine advances. This machine was later improved by the addition of a transverse knife to sever the continuous length strip into individual lengths of manageable proportions. This knife is more or less engrafted on the structure of Patent 2,345,425 and was operated by a cycle-clutch mechanism disclosed in Patent 3,061,059, dated Oct. 30, 1962. Since these disclosures are used virtually unchanged in the present invention they will not receive detailed description here.

The prior art contains numerous disclosures used either to pick up and roll consecutive lengths previously severed from an indefinitely long strip of sod, or to travel along the indefinite length of sod cutting it transversely at intervals and rolling the relatively short strips between severances. These machines are designed strictly for sod rolling and intended to traverse the previously cut strip. All suffer from guiding and alignment difficulties in that any lateral deviation from the previously severed strip immediately produces severe operating difficulties.

It is accordingly an object of this invention to combine in a single self-propelled vehicle continuously operating means for severing the sod from the earth and from the adjacent sod at the edges and to follow this by a periodically operative transverse knife which serves the dual purpose of severing the continuous strip into predetermined shorter lengths and initiating the roll-up of each strip as severed. This separating and initiating step is followed by a suitable mechanism for completing the roll-up of each individually severed strip.

The above and other objects will be made clear from the following detailed description taken in connection with the annexed drawings, in which:

FIGURE 3 is an elevation taken on the line 3—3 of FIGURE 1;

FIGURE 4 is an elevation partly in section taken on the line 4—4 of FIGURE 1;

FIGURES 10, 11 and 12 are progressive and successive views illustrating the discharge of the finished sod roll from the general path of the machine.

Figure 1:
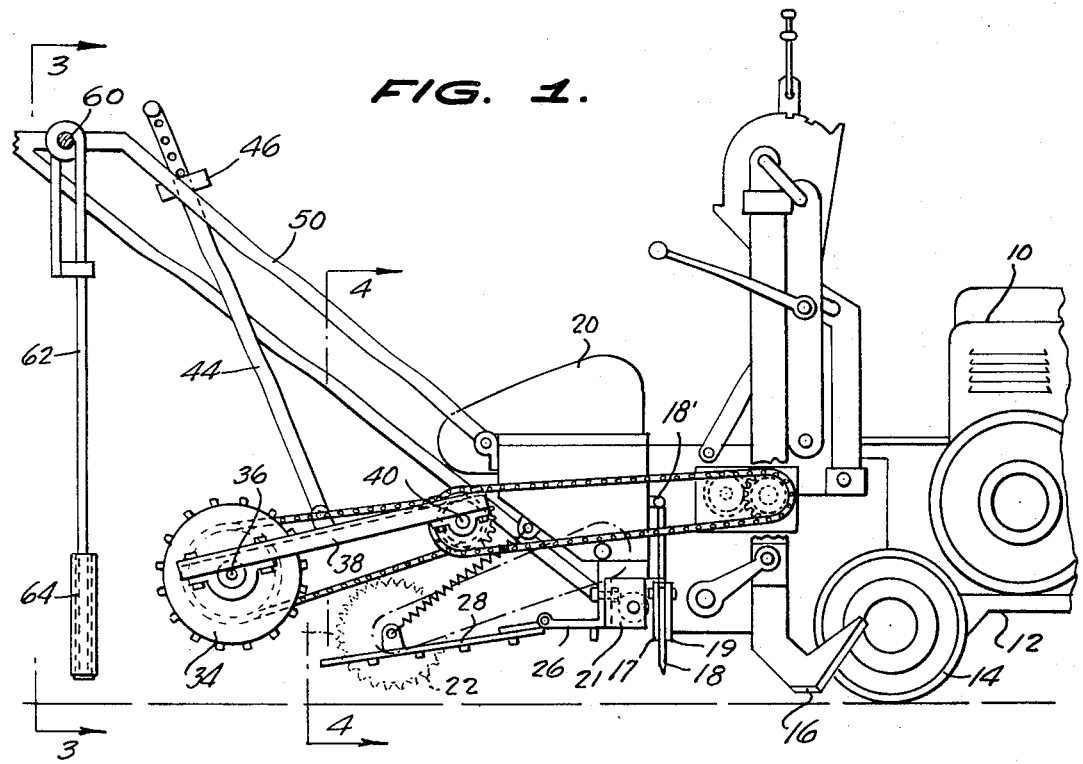
FIGURE 1 is a side elevation of the improved apparatus.
Figure 2:
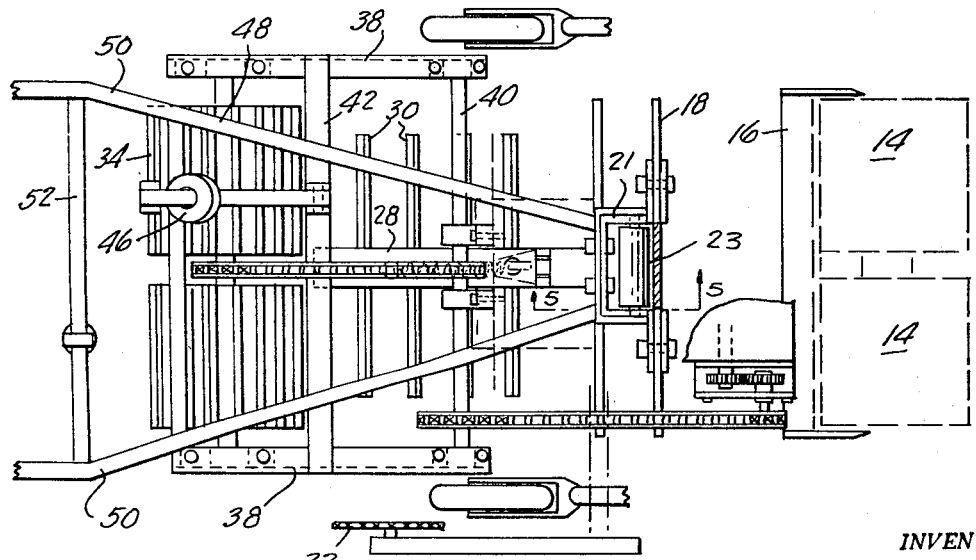
FIGURE 2 is a top plan view of the improved apparatus.

Referring now to FIGURE 1, and FIGURE 2, there is shown a motor 10 mounted on a frame 12 in which are journaled traction wheels 14. The motor 10 is connected (by means not specifically illustrated) with a conventional sod cutter 16 which operates continuously and is characterized by a reciprocating motion back and forth in the direction of the advance of the apparatus. Means are provided for raising and lowering the knife 16 from active to inactive position and all of this is as described in the aforementioned Patent 2,345,425, dated Mar. 28, 1944. Mounted in the rear of the continuous sod cutter 16 is a transverse knife 18 for cutting the continuous ribbon of sod produced by the knife 16 into desirable lengths. The knife 18 is driven cyclically by a clutch of the type shown in Patent 3,061,059, dated Oct. 30, 1962, and which is mounted in a housing 20. The clutch is triggered into its cycle by a sod contacting wheel 22, shown in FIGURES 1 and 2, and the cycle is as follows.

Figure 5:
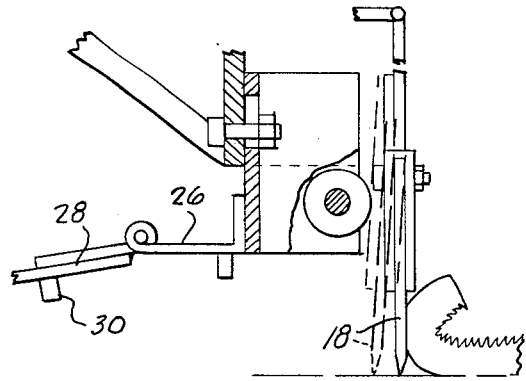
FIGURE 5 is a partial section on the line 5—5 of FIGURE 2.
Figure 6:
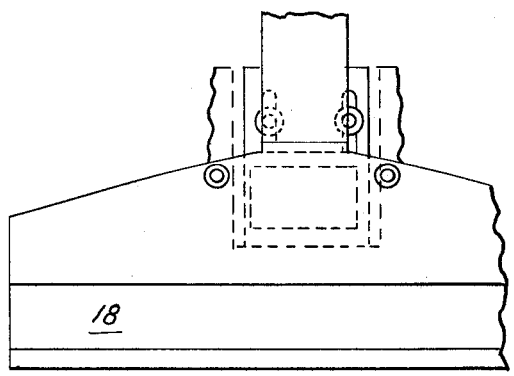
FIGURE 6 is an elevation taken on the line 6—6 of FIGURE 5.
Figure 7:
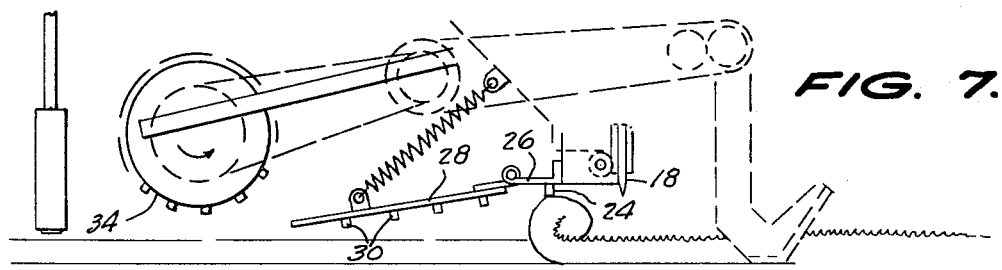
FIGURE 7 is a partial section taken on the line 7—7 of FIGURE 4.

From the position shown in FIGURE 1, and with the apparatus as a whole driven from left to right by the drive wheels 14, the cutter 18 is lowered to the position shown in FIGURE 5. It will be understood, of course, that while the cutter 18 is rising and falling vertically, it is nevertheless advancing from left to right with the machine as a whole. The cutter 18, as it begins to retract to its original position, swings slightly to the rear about a pivot 18′, while the leading edge of the sod strip is caught beneath a tooth or teeth 24 mounted on a member 26 to which is pivoted a member 28 supporting a plurality of teeth 30. The teeth 30 engage the upbuilding sod roll 32 and, as they move from left to right, further roll-up of the sod occurs with the member 28 rising about its pivot to accommodate the increasing diameter of the roll.

Figure 8:
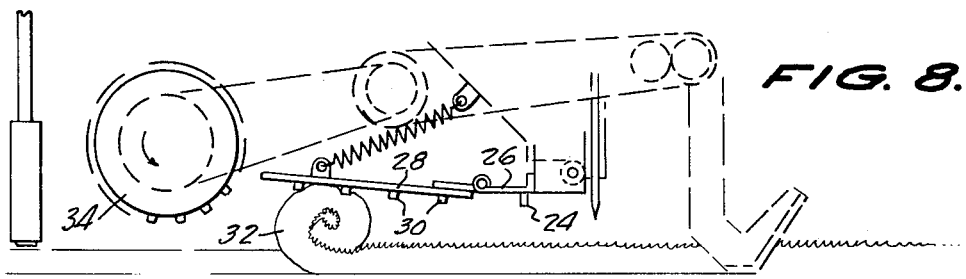
FIGURES 8 and 9 are similar to FIGURE 7, and illustrate the progressive build-up of a sod roll as a machine proceeds toward the right-hand edge of the several figures.
Figure 9:
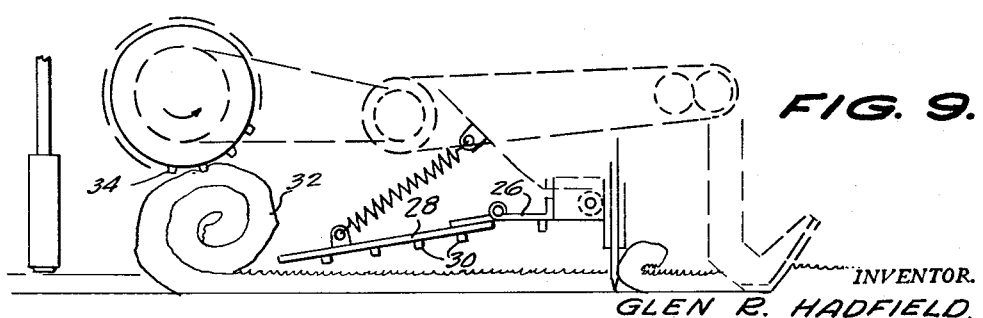

In FIGURE 9, the sod roll 32 is beyond the influence of the teeth 30 on member 28 and is in contact with a toothed roll 34 which is rotated counterclockwise by means of a series of sprockets. The axle 36 of the roll 34 is journaled at the end of a pair of side frame members 38 (FIGURE 2) which at their opposite ends are journaled to a shaft 40 which is driven from the main power plant and in turn drives the roll 34. By this construction and as will be shown by a comparison of FIGURES 8 and 9, the roll 34 is permitted to move vertically upward to accommodate increasing diameter of the sod roll 32.

A cross member 42 joins the side arms 38 and has pivoted thereto a rod 44 extending upwardly and rearwardly and having an adjustable stop 46 engaging a cross member 48 running between side frame members 50, the rod 44 and stop 46 prevent the roll 34 from engaging the sod roll 32 at too low a point for effective operation. This adjustment of the stop rod 44 is needed because while the sod strips usually are cut to uniform length, the sod thickness and therefore the diameter of the sod roll 32 will vary on occasion.

In FIGURE 9, while the sod roll 32 is being completed by the tooth roll 34, the knife 18 has descended and started a fresh cut by not only severing the sod strip but turing up the leading end for a repetition of the steps just described. When the sod roll 32 is complete, the tooth roll 34 passes over, leaving the sod roll stationary within the cut and the next steps in handling the roll are illustrated in FIGURES 10, 11 and 12.

When the toothed roll 34, by virtue of forward movement of the machine, passes over and leaves a sod roll 32, the roll 32, of course, is diametrically across the slot cut by the cutter 16. Since the next row or rows should be directly contiguous to this particular slot, it is desirable that roll 32 be turned to a position in which its axis is more or less parallel to the length of the slot so that the edges of the roll will not interfere with the subsequent pass of the machine making another cut.

As shown in FIGURES 1 and 3, a cross bar 60 passes between the frame members 50 and slidably supports a rod 62 at the free end of which is rotatably mounted a roll-engaging member 64. A rod 62 passes through a lower cross member 66 through an elongated slot 68 which supports the rod 62 against rearward motion but permits transverse sliding of the rod 62 in the slot 68. As the machine moves forward in the direction of the arrow of FIGURE 10, its rotatable extremity 64 encounters a roll 32 to the right of the center line of the machine, as shown in FIGURE 3. The operator then slides the rod 62 to the right of FIGURE 3, the rod being guided in the slot 68 of cross member 66, as shown in FIGURE 11. This initiates turning of the roll 32. In FIGURE 12, the turning operation is nearly complete and when the member 64 passes beyond the roll 32, the roll will have its axis substantially parallel to the path of the machine.

The foregoing substantially completes the description of the operation of the machine. The blade 18 is gripped between blade holders 17 and 19 (FIGURE 1) and an extension of the blade 18 enters which is journaled at 18' to a member extending from the housing 20 and is acted upon by the clutch mechanism to produce the cycle above described.

A housing 21 is secured to the machine frame and supports a roller 23 which bears against the blade holder 17 when it swings rearwardly to afford rolling support during vertical movements of the blade and blade holder.

While a specific embodiment of the invention has been described and shown herein, the invention is not to be limited to the precise details disclosed but only as set forth in the subjoined claims.

What is claimed is:

1. A self-propelled vehicle having mounted thereon a continuously operating sod-freeing knife reciprocable in the direction of advance of the vehicle for severing a continuous length of sod; a transverse knife to the rear of said sod-freeing knife, aligned therewith and of a width approximating that of said sod-freeing knife; means for vertical reciprocation of said transverse knife to sever a sod length and initiate its roll-up, and means to the rear of said transverse knife for encountering the initially rolled-up length and completing the rolling thereof, said vehicle including means for turning completed sod rolls to have their axes substantially parallel to the direction of vehicle advance.

2. An attachment for a self-propelled sod cutter comprising: a knife operating transverse the path of the sod cutter; means for the vertical reciprocation of said knife to sever a sod length and initiate its roll-up, and means to the rear of said knife for completing the rolling up of the severed sod, said attachment including means for turning completed sod rolls to have their axes substantially parallel to the direction of attachment advance.

3. A self-propelled vehicle having mounted thereon a continuously operating sod-freeing knife reciprocable in the direction of advance of the vehicle for severing a continuous length of sod; a planar, transverse knife to the rear of said sod-freeing knife, aligned therewith and of a width approximating that of said sod-freeing knife; power means operable at predetermined intervals for vertical reciprocation of said transverse knife to sever a sod length, the vertical reciprocation being related to the speed of advance of the machine so as to allow said transverse knife to initiate the roll-up of said sod length during a cycle of such reciprocation; and means mounted independently and to the rear of said transverse knife for encountering the initially rolled-up length and completing the rolling thereof during intervals between such cycles.

4. An attachment for a self-propelled sod cutter comprising: a planar knife operating transverse the path of the sod cutter; power means operable at predetermined intervals for the vertical reciprocation of said knife to sever a sod length, the vertical reciprocation being related to the speed of advance of the machine so as to allow said transverse knife to initiate the roll-up of said sod length during a cycle of such reciprocation and means to the rear of said knife for completing the rolling up of the severed sod during intervals between such cycles.

References Cited
UNITED STATES PATENTS

| | | | |
|---|---|---|---|
| 2,206,264 | 7/1940 | Rose | 172—21 |
| 2,345,425 | 3/1944 | Phillips | 172—20 |
| 2,778,292 | 1/1957 | Kavan | 172—20 |
| 2,987,124 | 6/1961 | Hadfield | 172—20 |

ABRAHAM G. STONE, *Primary Examiner.*

J. R. OAKS, *Assistant Examiner.*